US012051362B2

(12) United States Patent
Zhou et al.

(10) Patent No.: US 12,051,362 B2
(45) Date of Patent: Jul. 30, 2024

(54) DRIVING CIRCUIT HAVING A PRE-CHARGING CIRCUIT AND DRIVING METHOD FOR DISPLAY DEVICE

(71) Applicant: HKC CORPORATION LIMITED, Shenzhen (CN)

(72) Inventors: Renjie Zhou, Shenzhen (CN); Haijiang Yuan, Shenzen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/196,458

(22) Filed: May 12, 2023

(65) Prior Publication Data

US 2023/0368726 A1 Nov. 16, 2023

(30) Foreign Application Priority Data

May 12, 2022 (CN) ........................ 202210506675.8

(51) Int. Cl.
*G09G 3/32* (2016.01)

(52) U.S. Cl.
CPC ....... *G09G 3/32* (2013.01); *G09G 2300/0842* (2013.01); *G09G 2310/0251* (2013.01); *G09G 2320/0252* (2013.01)

(58) Field of Classification Search
CPC ........................................................ G09G 3/32
USPC ........................................................... 345/55
See application file for complete search history.

(56) References Cited

U.S. PATENT DOCUMENTS

2005/0110721 A1* 5/2005 Shin ....................... G09G 3/325 345/76
2005/0116747 A1* 6/2005 Shimoda .............. G09G 3/3283 327/108
2005/0219166 A1* 10/2005 Kim ..................... G09G 3/3291 345/76
2012/0274622 A1 11/2012 Huang et al.
2014/0333214 A1 11/2014 Okuno et al.
2023/0368726 A1 11/2023 Zhou et al.

FOREIGN PATENT DOCUMENTS

CN 101097681 A 1/2008
CN 102955313 A 3/2013
CN 103927985 A 7/2014
CN 112037706 A 12/2020
CN 112927646 A 6/2021
CN 114360454 A 4/2022
CN 114974084 A 8/2022

* cited by examiner

*Primary Examiner* — Long D Pham
(74) *Attorney, Agent, or Firm* — Franklin & Associates International Inc; Matthew F. Lambrinos

(57) ABSTRACT

Disclosed is a driving circuit and a driving method for a display unit, and a display device. By providing the pre-charging circuit in the driving circuit for the display unit and pre-charging the storage circuit according to the first pre-charging signal, a charging efficiency of the storage circuit is improved, and a response speed of the storage circuit is improved, achieving an effect of improving a response speed of the display unit; meanwhile, when a control circuit turns on the startup circuit, a second pre-charging signal is output by a signal output circuit to pre-charge at least one target pre-charging circuit, improving a charging efficiency of the display unit corresponding to the pre-charging circuit.

17 Claims, 5 Drawing Sheets

DRIVING CIRCUIT HAVING A PRE-CHARGING CIRCUIT AND DRIVING METHOD FOR DISPLAY DEVICE

CROSS REFERENCE

The present disclosure claims the priority of Chinese patent application No. 20210506675.8 filed on May 12, 2022 before the China National Intellectual Property Administration of the People's Republic of China, titled "driving circuit and driving method for display unit, and display device". The entire contents of the patent application identified above is incorporated by reference herein as if fully set forth.

FIELD

The present disclosure generally relates to the technical field of display panels, in particular to a driving circuit and a driving method for a display unit, and a display device.

BACKGROUND

With the development of related technologies, display technology has grown from a liquid crystal display (LCD) to a micro light emitting diode (micro-LED). A micro-LED array device refers to a two-dimensional array of a light emitting diode (LED) with a micro size and ultra-high density integrated on the same base, which has wide application fields, such as micro display equipment, life cell detection, and visible light communication. The micro-LED has higher brightness, better luminous efficiency, but lower power consumption than the LCD. A display effect of the micro-LED relates to a response speed of the micro-LED: the faster the response speed of the micro-LED, the better the display effect. In the related art, a low response speed of the micro-LED leads to an unsatisfactory display effect. Therefore, how to improve the response speed of the micro-LED has become a problem to be solved urgently.

SUMMARY

In a first aspect, the disclosure provides a driving circuit for a display unit, comprising a light emitting circuit, a startup circuit, a control circuit and a storage circuit, wherein the control circuit is connected with the startup circuit, the light emitting circuit is connected with the display unit, the startup circuit is connected with the light emitting circuit, the storage circuit is connected with the startup circuit; wherein, the startup circuit of the display unit further comprises a pre-charging circuit and a signal output circuit.

The pre-charging circuit is connected with the storage circuit and configured to pre-charge the storage circuit when receiving a first pre-charging signal which is a pre-charging signal output by a target signal output circuit.

The signal output circuit is connected with the control circuit and configured to output a second pre-charging signal for turning on at least one of target pre-charging circuits to perform pre-charging when the control circuit turns on the startup circuit.

In a second aspect, the disclosure further provides a driving method for a display unit, which is applied to a driving circuit for a display unit comprising:

a light emitting circuit, a startup circuit, a control circuit and a storage circuit, wherein the control circuit is connected with the startup circuit, the light emitting circuit is connected with the display unit, the startup circuit is connected with the light emitting circuit, and the storage circuit is connected with the startup circuit; wherein, the driving circuit for the display unit further comprises: a pre-charging circuit connected with the storage circuit and configured to pre-charge the storage circuit when receiving a first pre-charging signal which is a pre-charging signal output by a target signal output circuit; and a signal output circuit connected with the control circuit and configured to output a second pre-charging signal for turning on at least one target pre-charging circuit to perform pre-charging when the control circuit turns on the startup circuit; wherein the method comprises:

receiving a first pre-charging signal and pre-charge the storage circuit according to the first pre-charging signal; and outputting a second pre-charging signal for turning on at least one target pre-charging circuit to perform pre-charging when the control circuit turns on the startup circuit.

In a third aspect, the disclosure further provides a display device comprising: a substrate on which a plurality of sub-pixels are provided, wherein each of the sub-pixels comprises a display unit and a driving circuit for the display unit that is connected with the display unit, and the driving circuit for the display unit comprises: a light emitting circuit, a startup circuit, a control circuit and a storage circuit, wherein the control circuit is connected with the startup circuit, the light emitting circuit is connected with the display unit, the startup circuit is connected with the light emitting circuit, and the storage circuit is connected with the startup circuit, wherein, the driving circuit for the display unit further comprises: a pre-charging circuit connected with the storage circuit and configured to pre-charge the storage circuit when receiving a first pre-charging signal which is a pre-charging signal output by a target signal output circuit; and a signal output circuit connected with the control circuit and configured to output a second pre-charging signal for turning on at least one target pre-charging circuit to perform pre-charging when the control circuit turns on the startup circuit.

The driving circuit for a display unit provided by an embodiment of the disclosure comprises a light emitting circuit, a startup circuit, a control circuit and a storage circuit, wherein the control circuit is connected with the startup circuit, the light emitting circuit is connected with the display unit, the startup circuit is connected with the light emitting circuit, and the storage circuit is connected with the startup circuit; wherein, the driving circuit for the display unit further comprises: a pre-charging circuit connected with the storage circuit and configured to pre-charge the storage circuit when receiving a first pre-charging signal which is a pre-charging signal output by a target signal output circuit; and a signal output circuit connected with the control circuit and configured to output a second pre-charging signal for turning on at least one target pre-charging circuit to perform pre-charging when the control circuit turns on the startup circuit in the control circuit; by providing the pre-charging circuit in the driving circuit for the display unit and pre-charging the storage circuit according to the first pre-charging signal, a charging efficiency of the storage circuit is improved, and a response speed of the storage circuit is improved, achieving an effect of improving a response speed of the display unit, and improving a light emitting effect of the display unit; meanwhile, when a control circuit turns on the startup circuit, a second pre-charging signal is output by a signal output circuit to pre-charge at least one target pre-charging circuit, and when the current display unit is driven to emit light, the target pre-charging circuit corresponding to at least on display unit is charged, so as to pre-charge the display unit corresponding to the target pre-charging circuit, improving a charging efficiency of the display unit corresponding to the pre-charging circuit, and improving the response speed of the display unit corresponding to the target pre-charging circuit.

DESCRIPTION OF REFERENCE NUMERALS

1—light emitting circuit; 2—startup circuit; 3—control circuit; 4—storage circuit; 5—pre-charging circuit; 6—signal output circuit; 61—trigger unit; 610—output end; 62—inverter; 7—display unit; 8—target pre-charging circuit; 9—driving circuit for a display unit; 10—substrate; 11—sub-pixel; C N—storage capacitor; T1—first thin film transistor; T2—second thin film transistor; T3—third thin film transistor; T4—fourth thin film transistor; C1—clock signal input end; D—input end; Q—first output end; $\overline{Q}$—second output end; Va—reference voltage; Vdata—data voltage; Scan1—first scanning signal; Scan2—second scanning signal; Vdd—power supply voltage; Vss—ground.

DETAILED DESCRIPTION

In order to more clearly describe the technical solution of embodiments of the present disclosure, the Detailed Description of the present disclosure will be described below with reference to the accompanying drawings. Apparently, the accompanying drawings in the following description are only some embodiments of the present disclosure, and those skilled in the art can obtain other accompanying drawings and other implementations based on these drawings without any creative effort.

For the sake of brevity, each figure only schematically shows the parts relevant to the disclosure, and they do not represent the actual structure of the product. In addition, to make the drawings concise and easy to understand, in some drawings, only one of the components having the same structure or function is schematically drawn, or only one of them is marked. Herein, "one" not only means "only one", but also means "a plurality of".

The disclosure will be described in further detail below in combination with the accompanying drawings and embodiments.

First Embodiment

Figure 1:
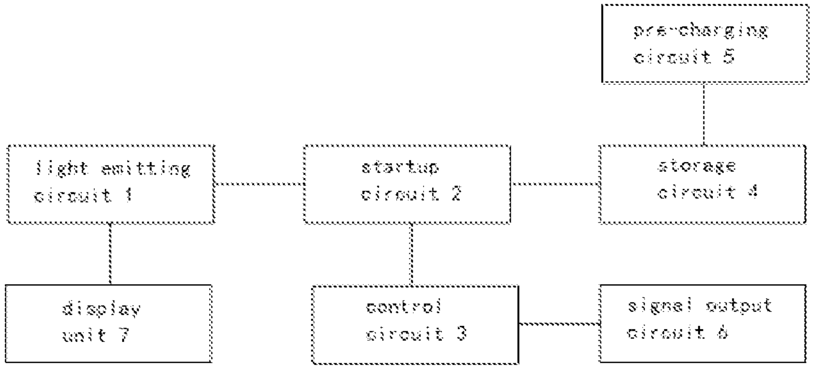
FIG. 1 is a basic structure diagram of a driving circuit for a display unit in a first embodiment of the disclosure.

Referring to FIG. 1, FIG. 1 is a structure diagram of a driving circuit 9 for a display unit in an embodiment of the present disclosure. The driving circuit 9 for the display unit comprises but is not limited to: a light emitting circuit 1, a startup circuit 2, a control circuit 3 and a storage circuit 4. The control circuit 3 is connected with the startup circuit 2, the light emitting circuit 1 is connected with the display unit 7, the startup circuit 2 is connected with the light emitting circuit 1, the storage circuit 4 is connected with the startup circuit 2; the driving circuit 9 for the display unit further comprises a pre-charging circuit 5 and a signal output circuit 6.

The pre-charging circuit 5 is connected with the storage circuit 4, the pre-charging circuit 5 pre-charges the storage circuit 4 when receiving a first pre-charging signal which is a pre-charging signal output by the target signal output circuit 6.

The signal output circuit 6 is connected with the control circuit 3, and when the control circuit 3 turns on the startup circuit 2, the signal output circuit 6 outputs a second pre-charging signal for turning on at least one target pre-charging circuit 8 (shown in FIG. 5) to perform pre-charging.

It should be understood that the driving circuit 9 for the display unit in the present disclosure is disposed in a display device comprising a plurality of sub-pixels arranged in a matrix, and a plurality of the sub-pixels arranged in a matrix comprises pixels in a plurality of pixel rows and pixels in a plurality of pixel columns, wherein each pixel row comprises a plurality of sub-pixels, each sub-pixel comprises at least one display unit 7, each sub-pixel is charged and displayed from a first direction to a second direction in sequence, and the first direction and the second direction are opposite, that is, the display unit 7 in each pixel row is charged and displayed from the first direction to the second direction in sequence; wherein, the target pre-charging circuit 8 is the pre-charging circuit in a driving circuit corresponding to the display unit 7 in the second direction of the current display unit 7, for example, a pixel row comprises a plurality of display units 7, and the display units 7 in the pixel row are sorted in sequence from the first direction to the second direction, the current display unit 7 is the Nth display unit 7, and then the pre-charging circuit 5 is taken as the target pre-charging circuit 8 in the driving circuit corresponding to at least one display unit 7 among the (N+1)th, (N+2)th, (N+3)th, and (N+4)th display units 7; wherein, the target signal output circuit 6 is the signal output circuit 6 in the driving circuit corresponding to the display unit 7 in the first direction of the current display unit 7, for example, a pixel row comprises a plurality of display units 7, the display units 7 in the pixel row are sorted in sequence from the first direction to the second direction, the current display unit 7 is the Nth display unit 7, and then the signal output circuit 6 in the driving circuit corresponding to at least one display unit 7 among the (N−1)th, (N−2)th, (N−3)th, and (N−4)th display units 7 is the target signal output circuit 6;

Following the above example, that is, the target signal output circuit 6 is the signal output circuit 6 in the driving circuit 9 currently being charged of the display unit, and the target pre-charging circuit 8 is the pre-charging circuit 5 in the driving circuit 9 corresponding to at least one display unit 7 among N display units 7 after the current display unit 7.

Figure 2:
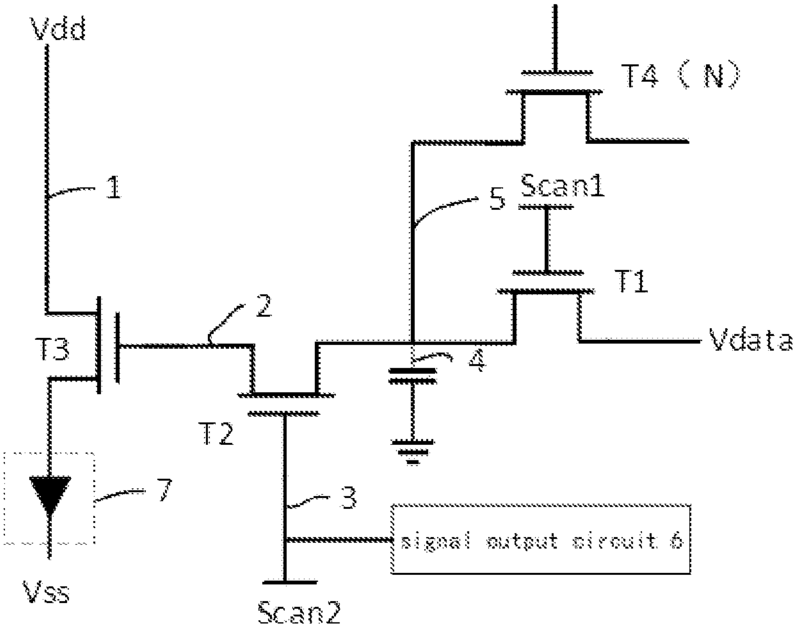
FIG. 2 is a basic structure diagram of an optimal driving circuit for a display unit in a first embodiment of the disclosure.

It should be understood that, as shown in FIG. 2, the light emitting circuit 1 is connected with an anode of the display unit 7 for driving the display unit 7 to emit light, the startup circuit 2 is configured to turn on the light emitting circuit 1, and the control circuit 3 is configured to turn on the startup circuit 2. The storage circuit 4 is provided with a storage capacitor C N for storing a data voltage Vdata, and the storage capacitor C N turns on the light emitting circuit 1 through the startup circuit 2;

In the above example, as shown in FIG. 2, the startup circuit 2 comprises a first thin film transistor T1 and a second thin film transistor T2, and a connection point between the startup circuit 2 and the storage circuit 4 is a first node. A control end of the first thin film transistor T1 is connected with an output circuit of a first scanning signal Scant, a first end of the first thin film transistor T1 is connected with an output circuit of the data voltage Vdata, and a second end of the first thin film transistor T1 is connected with the first node. When the first scanning signal Scant turns on the first thin film transistor T1, the first thin film transistor T1 transmits the data voltage Vdata to the first node, so as to charge the storage circuit 4 through the first node, that is, the first scanning signal Scant is a turn-on signal, thereby realizing reuse of the first scanning signal and avoiding setting a signal for controlling pre-charging separately. The control end of the second thin film transistor T2 is connected with an output circuit of a second scanning signal Scan2 through the control circuit 3, a first end of the second thin film transistor T2 is connected with the first node, a second end of the second thin film transistor T2 is connected with the light emitting circuit 1. When the second scanning signal Scan2 turns on the second thin film transistor T2, the second thin film transistor T2 transmits the voltage of the storage circuit 4 to the light emitting circuit 1, so as to turn on the light emitting circuit 1.

As shown in FIG. 2, the light emitting circuit 1 comprises a third thin film transistor T3, a control end of the third thin film transistor T3 is connected with the startup circuit 2, a first end of the third thin film transistor T3 is connected with an output circuit of a power supply voltage Vdd, a second end of the third thin film transistor T3 is connected with an anode of the display unit 7, and a cathode of the display unit 7 is connected with the ground; when the startup circuit 2 turns on the third thin film transistor T3, the light emitting circuit 1 drives the display unit 7 to emit light.

It should be understood that the embodiment does not limit types of the first, the second and the third thin film transistors T3, which can be flexibly set by relevant personnel. For example, the first, the second and the third thin film transistors T3 may be a P-type thin film transistor or an N-type thin film transistor; for example, the first, the second and the third thin film transistors T3 are all N-type thin film transistors and are turned on when the control end of the first thin film transistor T1 receives a high-level first scanning signal Scant, when the control end of the second thin film transistor T1 receives a high-level second scanning signal Scan2, and the control end of the third thin film transistor T3 receives a high-level signal.

In some examples of this embodiment, as shown in FIG. 2, the pre-charging circuit 5 comprises a fourth thin film transistor T4; a first end of the fourth thin film transistor T4 is connected with an output circuit of a reference voltage Va, and a second end of the fourth thin film transistor T4 is connected with the storage circuit 4; when a control end of the fourth thin film transistor T4 receives the first pre-charging signal, the first end and the second end of the fourth thin film transistor T4 is controlled to be connected to transmit the reference voltage Va to the storage circuit 4 for pre-charging the storage circuit 4. That is, the control end of the fourth thin film transistor T4 is configured to receive the first pre-charging signal; the fourth thin film transistor T4 may be a P-type thin film transistor or an N-type thin film transistor, and the type of the fourth thin film transistor T4 is not limited in this embodiment;

in some examples, in the same pixel row, the fourth thin film transistors T4 in the driving circuits 9 for the adjacent display units are of opposite types; wherein, the opposite types mean that when one of the thin film transistors is a P-type thin film transistor, the other is a N-type thin film transistor; for example, in the same pixel row, the fourth thin film transistor T4 in the driving circuit 9 for the (N−1)th display unit is a P-type thin film transistor, the fourth thin film transistor T4 in the driving circuit 9 for the Nth display unit is a N-type thin film transistor, the fourth thin film transistor T4 in the driving circuit 9 for the (N+1)th display unit is a P-type thin film transistor, and so on.

In some examples, in the same pixel row, the fourth thin film transistors T4 in the driving circuits 9 for the adjacent two display units are of opposite type, for example, in a same pixel row, the fourth thin film transistor T4 in the driving circuit 9 for the N−1th display unit is a P-type thin film transistor, the fourth thin film transistor T4 in the driving circuit 9 for the Nth display unit is a P-type thin film transistor, the fourth thin film transistor T4 in the driving circuit 9 for the (N+1)th display unit is a N type thin film transistor, the fourth thin film transistor T4 in the driving circuit 9 for the (N+2)th display unit is a N-type thin film transistor, the fourth thin film transistor T4 in the driving circuit 9 for the (N+3)th display unit is a P-type thin film transistor, and so on.

In some examples, in the same pixel row, the fourth thin film transistor T4 in the driving circuit 9 for each display unit is of the same type.

Figure 3:
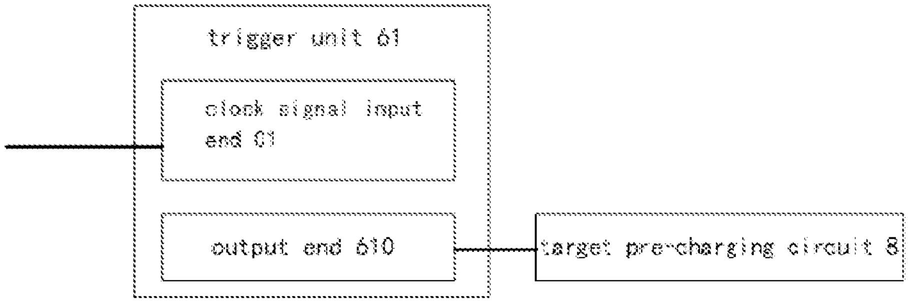
FIG. 3 is a basic structure diagram of an optimal trigger unit in a first embodiment of the disclosure.

In some examples of this embodiment, as shown in FIG. 3, the signal output circuit 6 comprises a trigger unit 61, a clock signal input end C1 of the trigger unit 61 is connected with the control circuit 3, and an output end 610 of the trigger unit 61 is connected with the at least one target pre-charging circuit 8. When the clock signal input end C1 receives a turn-on signal transmitted by the control circuit 3 to turn on the startup circuit 2, the trigger unit 61 outputs the second pre-charging signal according to the turn-on signal, and one second pre-charging signal is configured to turn on the at least one target pre-charging circuits 8 for pre-charging.

It should be understood that the target pre-charging circuit 8 is the pre-charging circuit 5 in the driving circuit 9 for a display unit, wherein the target pre-charging circuit 8 is turned on, that is, the fourth thin film transistor T4 in the target pre-charging circuit 8 is turned on, so that the storage circuit 4 in the display unit 7 is pre-charged. In combination with the above description, it can be understood that the turn-on signal is the first scanning signal, thereby realizing reuse of the first scanning signal, and avoiding setting a signal for controlling pre-charging separately.

It should be understood that, in some examples, the trigger unit 61 outputs the second pre-charging signal when the control circuit 3 transmits the second scanning signal Scan2, for example, the trigger unit 61 is a flip-flop, an input end D of the flip-flop is connected with the control circuit 3, and the output end 610 is connected with at least one target pre-charging circuit 8. When the control circuit 3 transmits the second scanning signal Scan2 of first polarity, the second thin film transistor T2 is turned on, and when the target pre-charging circuit 8 is turned on by the second pre-charging signal of first polarity, in a case where the control circuit 3 transmits the second scanning signal Scan2 of first polarity, the flip-flop outputs the second pre-charging signal of first polarity; when the target pre-charging circuit 8 is not turned on by the second pre-charging signal of second polarity, in a case where the control circuit 3 transmits the second scanning signal Scan2 of first polarity, the flip-flop outputs the second pre-charging signal of second polarity. For another example, in order to make the trigger unit 61 more sensitive and faster, the trigger unit 61 can be a D flip-flop, and then the second scanning signal Scan2 is switched from second polarity to first polarity, the D flip-flop can be triggered directly at the moment of a rising edge occurring in a level signal. Thereby, it is not necessary to wait for the arrival of the second scanning signal Scan2 of first polarity before triggering can be performed when the level signal is switched from the second polarity to the first polarity during level triggering. Therefore, the trigger unit 61 adopts a D flip-flop, which does not need to wait for the arrival of the second scanning signal Scan2 of first polarity, which is more sensitive and faster than level triggering. It can be understood that the first polarity and the second polarity are opposite, for example, the first polarity is a high level, and the second polarity is a low level.

Figure 4:
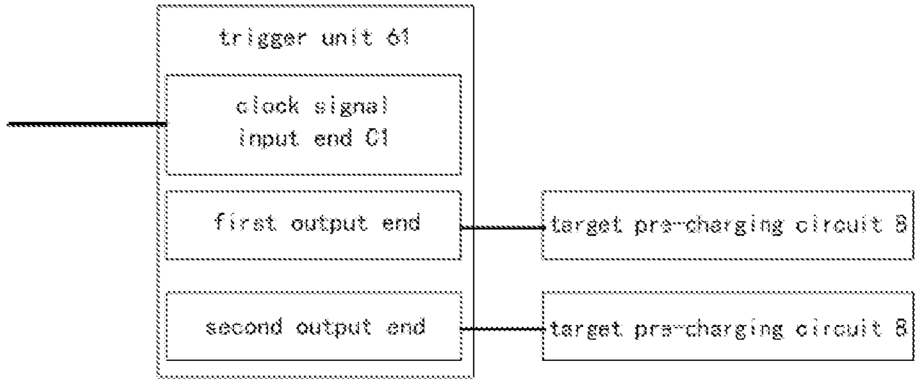
FIG. 4 is a basic structure diagram of another optimal trigger unit in a first embodiment of the disclosure.

In some examples, as shown in FIG. 4, the output end of the trigger unit 61 comprises a first output end Q and a second output end $\overline{Q}$, the first output end Q is connected with the at least one target pre-charging circuit 8, and the second output end $\overline{Q}$ is connected with the at least one target pre-charging circuits 8; when the target pre-charging circuit 8 connected with the first output end Q is turned on by the second pre-charging signal of first polarity and the target pre-charging circuit 8 connected with the second output end $\overline{Q}$ is turned on by the second pre-charging signal of second polarity, the first output end Q outputs the second pre-charging signal of first polarity which turns on the target pre-charging circuit 8 connected with the first output end Q.

The second output end $\overline{Q}$ outputs the second pre-charging signal of second polarity, which turns on the target pre-charging circuit 8 connected with the second output end $\overline{Q}$, and the first polarity and the second polarity are opposite. It should be understood that the target pre-charging circuit 8 comprises the fourth thin film transistor T4 which is connected with the signal output circuit 6, so as to realize the turning on of the target pre-charging circuit 8 by controlling turning on of the fourth thin film transistor T4. Therefore, the target pre-charging circuit 8 is represented by the corresponding fourth thin film transistor T4 in the following description.

Following the above example, the first output end Q and the second output end $\overline{Q}$ are respectively connected with different fourth thin film transistors T4, and the different fourth thin film transistors T4 are corresponding thin film transistors in the startup circuits 2 corresponding to the different display units 7 in the same pixel row. The display unit 7 corresponding to the fourth thin film transistor T4 connected with the first output end Q is adjacent to the display unit 7 corresponding to the fourth thin film transistor T4 connected with the second output end $\overline{Q}$; for example, the current display unit 7 is the Nth display unit 7, the first output end Q is connected with the fourth thin film transistor T4 in the startup circuit 2 corresponding to the (N+1)th display unit 7, the second output end $\overline{Q}$ is connected with the fourth thin film transistor T4 in the startup circuit 2 corresponding to the (N+2)th display unit 7; or the first output end Q is connected with the fourth thin film transistor T4 in the startup circuit 2 corresponding to the (N+2)th display unit 7, and the second output end $\overline{Q}$ is connected with the fourth thin film transistor T4 in the startup circuit 2 corresponding to the (N+1)th display unit 7; it should be understood that types of the fourth thin film transistors T4 in the startup circuits 2 in the driving circuits 9 for two adjacent display units are different, that is, the type of the fourth thin film transistor T4 corresponding to the current Nth display unit 7 is the same as that of the fourth thin film transistor T4 corresponding to the (N+2)th display units 7 and different from that of the fourth thin film transistor T4 corresponding to the (N+1)th display unit 7.

Figure 5:
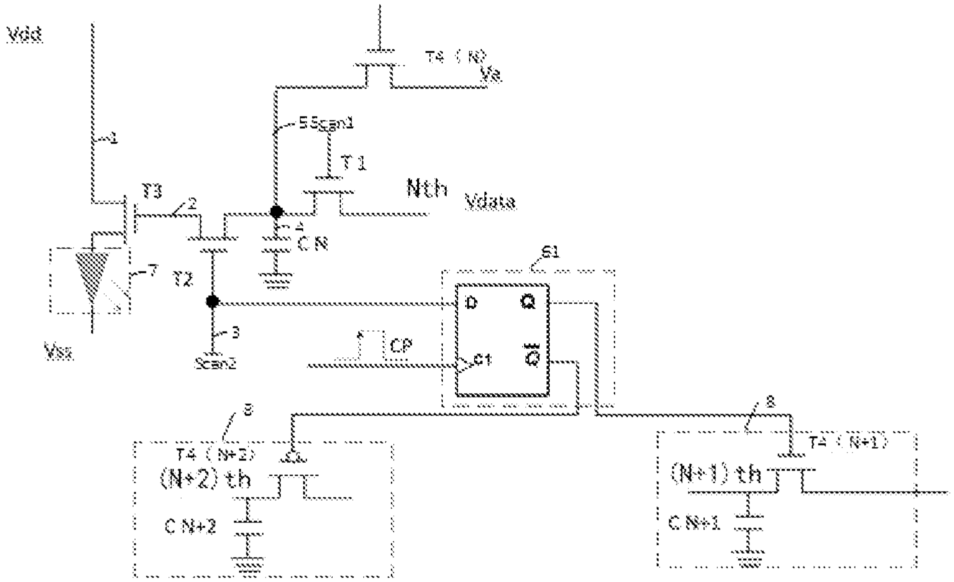
FIG. 5 is a basic structure diagram of another optimal driving circuit for a display unit in a first embodiment of the disclosure.

Specifically, for example, the trigger unit 61 is a D flip-flop as shown in FIG. 5, wherein D is the input end D, C1 is the clock signal input end C1, Q is the first output end Q, $\overline{Q}$ is the second output end $\overline{Q}$, and both the clock signal input end C1 and the input end D of the D flip-flop are connected with the control circuit 3, the first output end Q of the D flip-flop is connected with the target pre-charging circuit 8 corresponding to the (N+1)th display unit 7, that is, connected with the fourth thin film transistor T4 corresponding to the (N+1)th display unit 7. The second output end $\overline{Q}$ of the D flip-flop is connected with the fourth thin film transistor T4 corresponding to the (N+2)th display unit 7, and the fourth thin film transistor T4 corresponding to the (N+1)th display units 7 is an N-type thin film transistor, the fourth thin film transistor T4 corresponding to the (N+2)th display units 7 is a P-type thin film transistor. At this time, when the second scanning signal Scan2 transmitted by the control circuit 3 is switched from a low level to a high level, the D flip-flop is triggered. According to the high-level signal transmitted by the control circuit 3 to the output end 610 of the D flip-flop, a high-level second pre-charging signal is output at the first output end Q to turn on the fourth thin film transistor T4 corresponding to the (N+1)th display unit 7 to pre-charge the startup circuit 2 corresponding to the (N+1)th display unit 7; according to the high-level signal transmitted by the control circuit 3 to the output end 610 of the D flip-flop, a low-level second pre-charging signal is output at the second output end $\overline{Q}$ to turn on the fourth thin film transistor T4 corresponding to the (N+2)th display unit 7 to pre-charge the startup circuit 2 corresponding to the (N+2)th display unit 7.

Figure 6:
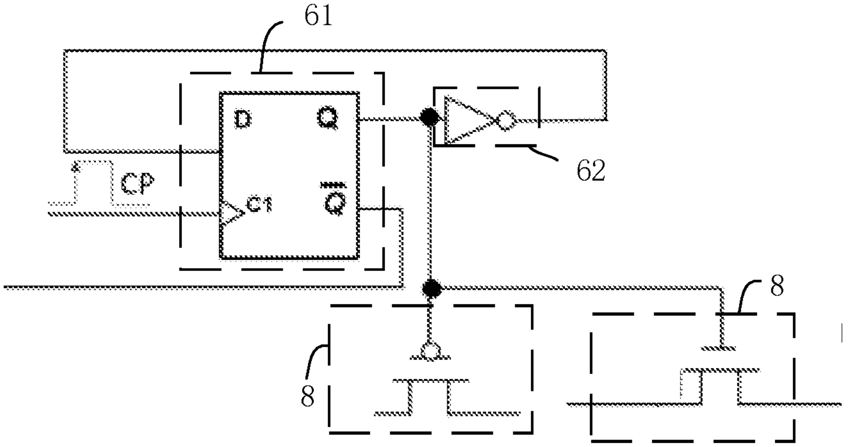
FIG. 6 is a basic structure diagram of an optimal signal output circuit in a first embodiment of the disclosure.

In some examples of the embodiment, as shown in FIG. 6, when the first output end Q is connected with at least two of the target pre-charging circuits 8, at least one of which is turned on by the second pre-charging signal of first polarity, and at least one of which is turned on by the second pre-charging signal of second polarity, the signal output circuit 6 further comprises an inverter 62; a first end of the inverter 62 is connected with the first output end Q, a second end of the inverter 62 is connected with the input end D of the trigger unit 61, the inverter 62 is configured to invert the second pre-charging signal of first polarity output by the first output end Q to obtain the second pre-charging signal of second polarity, and to output the second pre-charging signal of second polarity to the trigger unit 61, so that the first output end Q of the trigger unit 61 outputs the second pre-charging signal of second polarity, and the second output end $\overline{Q}$ of the trigger unit 61 outputs the second pre-charging signal of first polarity. That is, the first output end Q is at least connected with the fourth thin film transistors T4 corresponding to two display units 7, one of which is an N-type thin film transistor and the other is a P-type thin film transistor. In order to make the N-type thin film transistor and the P-type thin film transistor turned on, it is necessary for the trigger unit 61 to output the second pre-charging signal of first polarity by the first output end Q when the trigger unit 61 is triggered for the Nth time, to output the second pre-charging signal of second polarity by the first output end Q when the trigger unit 61 is triggered for the (N+1)th time. It should be understood that when the trigger unit 61 is triggered, the polarity of the second pre-charging signal output by the first output end Q is the same as the polarity of the signal input by the input end D of the trigger unit 61. Therefore, when the second pre-charging signal of first polarity is output at the first output end Q, the second pre-charging signal of first polarity is inverted by the inverter 62 and output to the input end D of the trigger unit 61, so that the trigger unit 61 outputs the second pre-charging signal of second polarity when triggered next time.

Following the above example, for example, the trigger unit 61 is a D edge-triggered flip-flop, the clock signal input end C1 of the D edge-triggered flip-flop is connected with the control circuit 3, the first output end Q of the D edge-triggered flip-flop is connected with the fourth thin film transistor T4 corresponding to the (N+1)th display unit 7 and the fourth thin film transistor T4 corresponding to the (N+2)th display units 7, the fourth thin film transistors T4 corresponding to the (N+1)th display units 7 is an N-type thin film transistor, and the thin film transistor T4 corresponding to the (N+2)th display unit 7 is a P-type thin film transistor. When the control circuit 3 transmits a high-level scanning signal, the startup circuit 2 is turned on, an initial signal of the input end D of the D flip-flop is set as a high-level signal. As the D edge-triggered flip-flop detects a rising edge at the moment when the scanning signal transmitted by the control circuit 3 becomes a high level for the Nth time, that is, at the moment when the clock signal input end C1 receives the signal, the first output end Q outputs a high-level second pre-charging signal, thereby turning on the fourth thin film transistor T4 corresponding to the (N+1)th display unit 7 to perform pre-charging. The second output end $\overline{Q}$ outputs a low-level second pre-charging signal, while the high-level second pre-charging signal output by the first output end Q is input to the input end D via the inverter 62, so that the initial signal of the input end D is a low-level signal. Since the D edge-triggered flip-flop detects a rising edge at the first moment of T2 when a low level becomes a high level; the D edge-triggered flip-flop detects a rising edge at the moment when the scanning signal transmitted by the control circuit 3 becomes a high level for the (N+1)th time; at this time, an initial signal of the input end D of the D edge-triggered flip-flop is a low-level signal, so at the moment of receiving the signal, the first output end Q outputs the low-level second pre-charging signal, thereby turning on the fourth thin film transistor T4 corresponding to the (N+1)th display unit 7 to perform pre-charging; the second output end $\overline{Q}$ outputs a high-level signal.

Following the above example, it can be understood that the second output end $\overline{Q}$ also sequentially outputs the second pre-charging signal of first polarity and the second pre-charging signal of second polarity. Therefore, the second output end $\overline{Q}$ can also be connected with at least two target pre-charging circuits 8, and types of the two connected thin film transistors are different, which are not repeated here.

In some examples of the embodiment, when the first output end Q is connected with at least two target pre-charging circuits 8 and at least one of the target pre-charging circuits 8 connected with the first output end Q is turned on by the second pre-charging signals of first polarity and second polarity, the second output end $\overline{Q}$ is connected with the input end D of the trigger unit 61; when the first output end Q outputs the second pre-charging signal of first polarity and the second output end $\overline{Q}$ outputs the second pre-charging signal of second polarity, the second output end $\overline{Q}$ outputs the second pre-charging signal of second polarity to the trigger unit 61, so that the first output end Q of the trigger unit 61 outputs the second pre-charging signal of second polarity and the second output end $\overline{Q}$ of the trigger unit 61 outputs the second pre-charging signal of first polarity. It can be understood that the above examples illustrate how the trigger unit 61 is changed by the inverter 62, whereas the second pre-charging signal output by the second output end $\overline{Q}$ is opposite to the signal of the input end D of the trigger unit 61. Therefore, the second output end $\overline{Q}$ can be directly connected with the input end D of the trigger unit 61, which can achieve the same technical effect as that of the inverter 62, and will not be repeated here.

The present embodiment provides a driving circuit 9 for a display unit, and the driving circuit 9 comprises a light emitting circuit 1, a startup circuit 2, a control circuit 3 and a storage circuit 4, wherein the control circuit 3 is connected with the startup circuit 2, the light emitting circuit 1 is connected with the display unit 7, the startup circuit 2 is connected with the light emitting circuit 1, and the storage circuit 4 is connected with the startup circuit 2. The driving circuit 9 for the display unit further comprises: a pre-charging circuit 5 and a signal output circuit 6, wherein the pre-charging circuit 5 is connected with the storage circuit 4 and is configured to pre-charge the storage circuit 4 when receiving a first pre-charging signal which is a pre-charging signal output by the target signal output circuit 6; the signal output circuit 6 is connected with the control circuit 3 and is configured to output a second pre-charging signal for turning on at least one target pre-charging circuit 8 to perform pre-charging when the control circuit 3 turns on the startup circuit 2. By providing the pre-charging circuit 5 in the driving circuit 9 for the display unit, and pre-charging the storage circuit 4 according to the first pre-charging signal, a charging efficiency of the storage circuit 4 is improved, and a response speed of the storage circuit 4 is improved, achieving an effect of improving a response speed of the display unit 7. By improving the response speed of display, a light emitting effect of the display unit 7 is improved. Meanwhile, when the control circuit 3 turns on the startup circuit 2, the second pre-charging signal is output by the signal output circuit 6 to pre-charge at least one target pre-charging circuit 8, when the current display unit 7 is driven to emit light, the target pre-charging circuit 8 corresponding to at least one display unit 7 is charged, so that the display unit 7 corresponding to the target pre-charging circuit 8 is pre-charged in advance, thereby improving charging efficiency of the display unit 7 corresponding to the target pre-charging circuit 8 and improving a response speed of the display unit 7 corresponding to the target pre-charging circuit 8.

Second Embodiment

Figure 7:
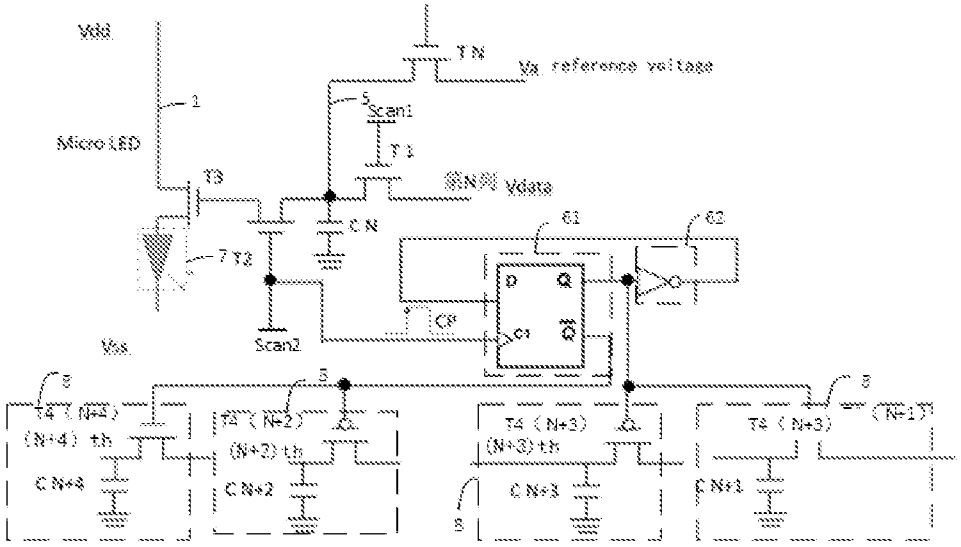
FIG. 7 shows a basic structure diagram of a driving circuit for a display unit in a second embodiment of the disclosure.

In order to better understand the present disclosure, the embodiment provides a more specific example to illustrate the present disclosure. As shown in FIG. 7, the driving circuit for the display unit comprises but is not limited to a light emitting circuit, a startup circuit, a control circuit and a storage circuit. The startup circuit comprises a first thin film transistor and a second thin film transistor, a connection point between the startup circuit and the storage circuit is a first node. A control end of the first thin film transistor is connected with an output circuit of a first scanning signal, a first end of the first thin film transistor is connected with an output circuit of a data voltage, and a second end of the first thin film transistor is connected with the first node. When the first scanning signal turns on the first thin film transistor, the first thin film transistor transmits the data voltage to the first node to charge the storage circuit via the first node; the control end of the second thin film transistor is connected with an output circuit of a second scanning signal through the control circuit, a first end of the second thin film transistor is connected with the first node, and a second end of the second thin film transistor is connected with the light emitting circuit. When the second scanning signal turns on the second thin film transistor, the second thin film transistor transmits the voltage of the storage circuit to the light emitting circuit to turn on the light emitting circuit. The light emitting circuit comprises a third thin film transistor, a control end of the third thin film transistor is connected with the startup circuit, a first end of the third thin film transistor is connected with a power supply voltage, a second end of the third thin film transistor is connected with an anode of the display unit, a cathode of the display unit is connected with the ground. When the startup circuit turns on the third thin film transistor, the light emitting circuit drives the display unit to emit light.

The driving circuit for the display unit further comprises: a pre-charging circuit connected with the storage circuit and configured to pre-charge the storage circuit when receiving a first pre-charging signal which is a pre-charging signal output by the target signal output circuit; and a signal output circuit connected with the control circuit and configured to output a second pre-charging signal for turning on at least one target pre-charging circuit to perform pre-charging when the control circuit turns on the startup circuit.

In some examples of this embodiment, the pre-charging circuit comprises a fourth thin film transistor, wherein a control end of the fourth thin film transistor is configured to receive the first pre-charging signal, a first end of the fourth thin film transistor is connected with an output circuit of a reference voltage, and a second end of the fourth thin film transistor is connected with the storage circuit. When the control end of the fourth thin film transistor receives the first pre-charging signal, the first end and the second end of the fourth thin film transistor are controlled to be connected to transmit the reference voltage to the storage circuit to pre-charge the storage circuit.

Wherein, the first thin film transistor, the second thin film transistor, and the third thin film transistor are all N-type thin film transistors, and types of the fourth thin film transistors of two adjacent display units are different. The fourth thin film transistor of the Nth display unit is a N-type thin film transistor, the fourth thin film transistor of the (N+1)th display unit is a N-type thin film transistor, the fourth thin film transistor of the (N+2)th display unit is a P-type thin film transistor, the fourth thin film transistor of the (N+3)th display unit is a P-type thin film transistor, and the fourth thin film transistor of the (N+4)th display unit is a N-type thin film transistor.

Wherein, the signal output circuit comprises a D edge-triggered flip-flop and an inverter, the clock signal input end C1 of the D edge-triggered flip-flop is connected with the control circuit, the first output end Q of the D edge-triggered flip-flop is connected with the fourth thin film transistors of the (N+1)th display unit and the (N+3)th display unit respectively and is also connected with the input end D of the inverter, the output end 610 of the inverter is connected with an input end DD of the D edge-triggered flip-flop, and the second output end $\hat{Q}$ is connected with the fourth thin film transistors of the (N+2)th display unit and the (N+4)th display unit respectively.

Before T1 is turned on, the first pre-charging signal output by the (N−1)th display unit first controls the fourth thin film transistor of the Nth display unit to be turned on for a period of time to pre-charge the capacitor C N to the reference voltage Va; when T1 is turned on by the first scanning signal, Vdata of the Nth column reaches the C N, the time for Vdata to charge the capacitor is reduced, and the voltage of the C N is Vdata+Va, thereby improving a response speed of the display unit and a speed of emitting light of the display unit; when T2 is turned on, the voltage on the C N reaches T3, and the display unit emits light.

When the control circuit transmits a high-level scanning signal and turns on T2, an initial signal of the input end D of the D flip-flop is set to be a high-level signal. Since the D edge-triggered flip-flop detects a rising edge at the moment when the scanning signal transmitted by the control circuit becomes a high level for the Nth time, that is, at the moment when the clock signal input end C1 receives the signal, the first output end Q outputs a high-level second pre-charging signal to turn on the fourth thin film transistor corresponding to the (N+1)th display unit is to perform pre-charging; the second output end $\overline{Q}$ outputs a low-level second pre-charging signal to turn on the fourth thin film transistor corresponding to the (N+2)th display unit to perform pre-charging; and the high-level second pre-charging signal output by the first output end Q is input to the input end D via the inverter, so that the initial signal of the input end D is a low-level signal. Since the D edge-triggered flip-flop detects a rising edge at the moment when the first low level of T2 is switched to a high level; the D edge-triggered flip-flop detects a rising edge at the moment when the scanning signal transmitted by the control circuit is switched to a high level for the (N+1)th time; at this time, an initial signal of the input end D of the D edge-triggered flip-flop is a low-level signal, at the moment of receiving the signal, the first output end Q outputs a low-level second pre-charging signal, thereby turning on the fourth thin film transistor corresponding to the (N+1)th display unit to perform pre-charging; the second output end $\overline{Q}$ outputs a high-level signal, thereby turning on the fourth thin film transistor corresponding to the (N+3)th display unit to perform pre-charging.

The driving circuit for the display unit provided in this embodiment realizes pre-charging of four display units by one flip-flop, thereby improving the response speed of at least two display units, improving a charging rate of the display unit, and effectively improving the response speed, which has the effect of improving the display effect. Moreover, the present disclosure adopts a rising edge-triggered D flip-flop, so that the flip-flop starts operation before a high level arrives, and the rising edge trigger is more sensitive and quicker than the level trigger.

Another Embodiment

Figure 8:
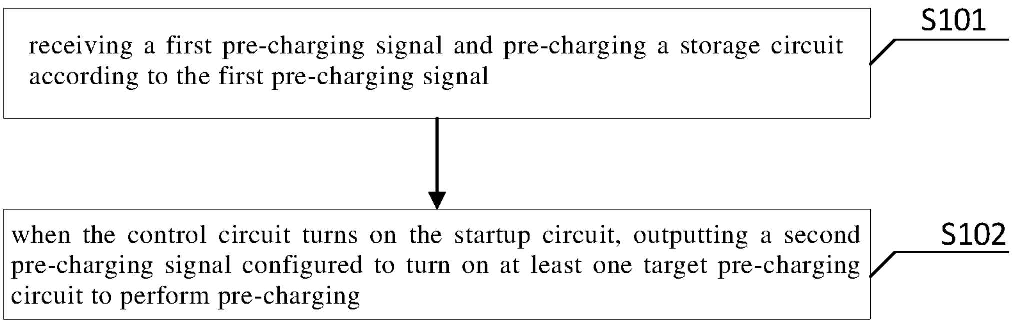
FIG. 8 is a basic process diagram of a driving method for a display unit in a third embodiment of the disclosure.

An embodiment of the present disclosure provides a driving method for a display unit, and the method is applied to any one of the driving circuits for the display unit described above. As shown in FIG. 8, the method comprises:

S101: receiving a first pre-charging signal and pre-charging a storage circuit according to the first pre-charging signal;

S102: when the control circuit turns on the startup circuit, outputting a second pre-charging signal configured to turn on at least one target pre-charging circuit to perform pre-charging.

It should be understood that the above-driving method for a display unit is applied to a driving circuit for the display unit, and the driving circuit for the display unit comprises a light emitting circuit, a startup circuit, a control circuit, and a storage circuit, wherein the control circuit is connected with the startup circuit, the light emitting circuit is connected with the display unit, the startup circuit is connected with the light emitting circuit, and the storage circuit is connected with the startup circuit. The driving circuit for the display unit further comprises a pre-charging circuit connected with the storage circuit and configured to pre-charge the storage circuit when receiving a first pre-charging signal which is the pre-charging signal output by a target signal output circuit, and a signal output circuit connected with the control circuit and configured to output a second pre-charging signal for turning on at least one target pre-charge circuit to perform pre-charging when the control circuit turns on the startup circuit. By setting a pre-charging circuit in the startup circuit of the display unit and pre-charging the storage circuit according to the first pre-charging signal, charging efficiency of the storage circuit is improved, thereby improving a response speed of the storage circuit, which achieves the effect of improving the response speed of the display unit, thereby improving the light emitting effect of the display unit. Meanwhile, when the control circuit turns on the startup circuit, the second pre-charging signal is output by the signal output circuit to pre-charge at least one target pre-charging circuit, and when the current display unit is driven to emit light, the target pre-charging circuit corresponding to at least one display unit is charged to pre-charge the display unit corresponding to the target pre-charging circuit in advance, which improves the charging efficiency of the display unit corresponding to the target pre-charging circuit, and improves the response speed of the display unit corresponding to the target pre-charging circuit.

Fourth Embodiment

Figure 9:
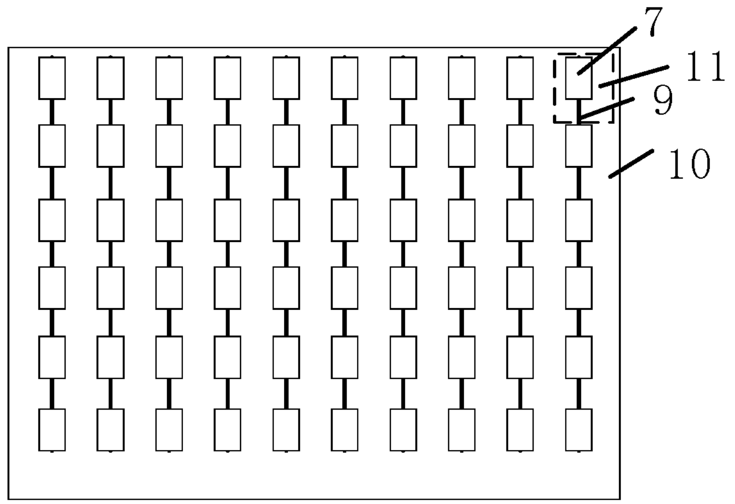
FIG. 9 is a basic structure diagram of a display device in a fourth embodiment of the disclosure.

An embodiment of the present disclosure provides a display device. As shown in FIG. 9, the display device comprises a substrate 10 on which a plurality of sub-pixels 11 are provided, and each of the sub-pixels 11 comprises a display unit 7 and any one of the above driving circuits 9 for the display unit that is connected with the display unit 7.

In some examples of the present disclosure, the display unit 7 comprises a red light display unit 7, a green light display unit 7 and a blue light display unit 7; alternatively, the display unit 7 comprises a red light display unit 7, a green light display unit 7, a blue light display unit 7 and a yellow light display unit 7; alternatively, the display unit 7 comprises a red light display unit 7, a green light display unit 7, a blue light display unit 7 and a white light display unit 7; the type of the display unit 7 comprises but is not limited to a micro-LED display unit 7.

Fifth Embodiment

Figure 10:
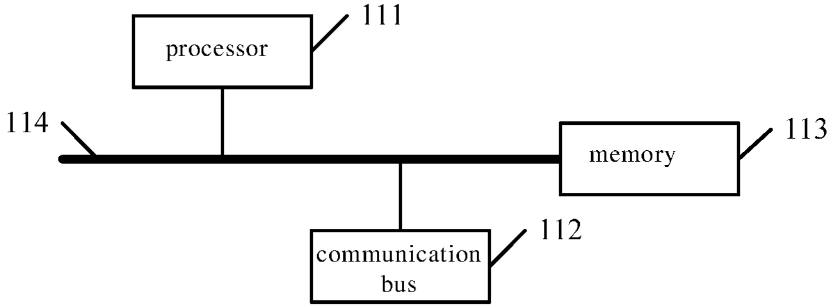
FIG. 10 is a structural diagram of a display apparatus in a fifth embodiment of the disclosure.

As shown in FIG. 10, an embodiment of the present disclosure provides a display device, comprising a processor 111, a communication interface 112, a memory 113, and a communication bus 114, wherein the processor 111, the communication interface 112, and the memory 113 communicate with each other by the communication bus 114.

The memory 113 is configured to store a computer program.

In an embodiment of the disclosure, when executing the program stored in the memory 113, the processor 111 is configured to implement the steps of the driving method for the display unit provided in any one of the foregoing method embodiments.

An embodiment of the present disclosure further provides a computer-readable storage medium on which a computer program is stored. When executed by a processor, the computer program implements the steps of the driving method for the display unit as provided in any one of the foregoing method embodiments.

It should also be noted that the term “comprises”, “comprising” or any other variants thereof is intended to cover non-exclusive inclusion, so that a process, method, article, or apparatus comprising a series of elements comprises not only those elements, but also comprises other elements not expressly listed, or elements inherent in the process, method, article, or apparatus. Without further limitations, an element defined by the phrase “comprising a . . . ” does not exclude the presence of additional identical elements in the process, method, article, or apparatus comprising the elements.

The above are only examples of the present disclosure and are not intended to limit the present disclosure. For those skilled in the art, various modifications and changes may occur in the disclosure. Any modification, equivalent replacement, improvement, etc. made within the spirit and principle of the present disclosure shall be comprised within the scope of the appended claims of the present disclosure.

What is claimed is:

1. A driving circuit for a display unit, comprising: a light emitting circuit, a startup circuit, a control circuit and a storage circuit, wherein the control circuit is connected with the startup circuit, the light emitting circuit is connected with the display unit, the startup circuit is connected with the light emitting circuit, and the storage circuit is connected with the startup circuit; wherein, the driving circuit for the display unit further comprises:

a pre-charging circuit connected with the storage circuit and configured to pre-charge the storage circuit when receiving a first pre-charging signal which is a pre-charging signal output by a target signal output circuit; and a signal output circuit connected with the control circuit and configured to output a second pre-charging signal for turning on at least one of target pre-charging circuits to perform pre-charging when the control circuit turns on the startup circuit.

2. The driving circuit for a display unit according to claim 1, wherein, the pre-charging circuit comprises a fourth thin film transistor, wherein a first end of the fourth thin film transistor is connected with an output circuit of a reference voltage, and a second end of the fourth thin film transistor is connected with the storage circuit; and when a control end of the fourth thin film transistor receives the first pre-charging signal, the first end and the second end of the fourth thin film transistor are controlled to be turned on, and the reference voltage is transmitted to the storage circuit to pre-charge the storage circuit.

3. The driving circuit for a display unit according to claim 2, wherein the fourth thin film transistor is a P-type thin film transistor.

4. The driving circuit for a display unit according to claim 1, wherein the signal output circuit comprises a trigger unit, a clock signal input end of which is connected with the control circuit, and an output end of which is connected with at least one of the target pre-charging circuits.

5. The driving circuit for a display unit according to claim 4, wherein when the clock signal input end receives a turn-on signal transmitted by the control circuit to turn on the startup circuit, the trigger unit outputs the second pre-charging signal according to the turn-on signal to turn on the at least one of the target pre-charging circuits to perform pre-charging.

6. The driving circuit for a display unit according to claim 5, wherein the output end of the trigger unit comprises a first output end and a second output end which are respectively connected with the at least one of the target pre-charging circuits.

7. The driving circuit for a display unit according to claim 6, wherein when the target pre-charging circuit connected with the first output end is turned on by the second pre-charging signal of first polarity and the target pre-charging circuit connected with the second output end is turned on by the second pre-charging signal of second polarity, the first output end outputs the second pre-charging signal of first polarity to turn on the target pre-charging circuit connected with the first output end; the second output end outputs the second pre-charging signal of second polarity to turn on the target pre-charging circuit connected with the second output end, wherein the first polarity and the second polarity are opposite.

8. The driving circuit for a display unit according to claim 7, wherein when the first output end is connected with at least two of the target pre-charging circuits, and when at least one of the target pre-charging circuits connected with the first output end is turned on by the second pre-charging signal of first polarity and at least one of the target pre-charging circuits connected with the first output end is turned on by the second pre-charging signal of second polarity, the signal output circuit further comprises an inverter.

9. The driving circuit for a display unit according to claim 8, wherein a first end of the inverter is connected with the first output end, a second end of the inverter is connected with an input end of the trigger unit, the inverter inverts the second pre-charging signal of first polarity output by the first output end to obtain the second pre-charging signal of second polarity and outputs the second pre-charging signal of second polarity to the trigger unit, so that the first output end of the trigger unit outputs the second pre-charging signal of second polarity, and the second output end of the trigger unit outputs the second pre-charging signal of first polarity.

10. The driving circuit for a display unit according to claim 7, wherein when the first output end is connected with at least two of the target pre-charging circuits, and when at least one of the target pre-charging circuits connected with the first output end is turned on by the second pre-charging signal of first polarity and at least one of the target pre-charging circuits connected with the first output end is turned on by the second pre-charging signal of second polarity, the second output end is connected with the input end of the trigger unit.

11. The driving circuit for a display unit according to claim 10, wherein when the first output end outputs the second pre-charging signal of first polarity and the second output end outputs the second pre-charging signal of second polarity, the second output end outputs the second pre-charging signal of second polarity to the trigger unit, so that the first output end of the trigger unit outputs the second pre-charging signal of second polarity and the second output end of the trigger unit outputs the second pre-charging signal of first polarity.

12. The driving circuit for a display unit according to claim 1, wherein the startup circuit comprises a first thin film transistor and a second thin film transistor, and a connection point between the startup circuit and the storage circuit is a first node.

13. The driving circuit for a display unit according to claim 12, wherein a control end of the first thin film transistor is connected with an output circuit of a first scanning signal, a first end of the first thin film transistor is connected with an output circuit of a data voltage, a second end of the first thin film transistor is connected with the first node, and when the first scanning signal turns on the first thin film transistor, the first thin film transistor transmits the data voltage to the first node to charge the storage circuit by the first node;

the control end of the second thin film transistor is connected with an output circuit of a second scanning signal by the control circuit, a first end of the second thin film transistor is connected with the first node, a second end of the second thin film transistor is connected with the light emitting circuit, and when the second scanning signal turns on the second thin film transistor, the second thin film transistor transmits a voltage of the storage circuit to the light emitting circuit and turns on the light emitting circuit.

14. The driving circuit for a display unit according to claim 1, wherein the light emitting circuit comprises a third thin film transistor, a control end of the third thin film transistor is connected with the startup circuit, a first end of the third thin film transistor is connected with an output circuit of a power supply voltage, a second end of the third thin film transistor is connected with an anode of the display unit, and a cathode of the display unit is connected with the ground; when the startup circuit turns on the third thin film transistor, the light emitting circuit drives the display unit to emit light.

15. A driving method for a display unit, which is applied to a driving circuit for a display unit comprising:

a light emitting circuit, a startup circuit, a control circuit and a storage circuit, wherein the control circuit is connected with the startup circuit, the light emitting circuit is connected with the display unit, the startup circuit is connected with the light emitting circuit, and the storage circuit is connected with the startup circuit; wherein, the driving circuit for the display unit further comprises: a pre-charging circuit connected with the storage circuit and configured to pre-charge the storage circuit when receiving a first pre-charging signal which is a pre-charging signal output by a target signal output circuit; and a signal output circuit connected with the control circuit and configured to output a second pre-charging signal for turning on at least one target pre-charging circuit to perform pre-charging when the control circuit turns on the startup circuit;

wherein the method comprises:

receiving a first pre-charging signal and pre-charge the storage circuit according to the first pre-charging signal; and outputting a second pre-charging signal for turning on at least one target pre-charging circuit to perform pre-charging when the control circuit turns on the startup circuit.

16. A display device comprising:

a substrate on which a plurality of sub-pixels are provided, wherein each of the sub-pixels comprises a display unit and a driving circuit for the display unit that is connected with the display unit, and the driving circuit for the display unit comprises:

a light emitting circuit, a startup circuit, a control circuit and a storage circuit, wherein the control circuit is connected with the startup circuit, the light emitting circuit is connected with the display unit, the startup circuit is connected with the light emitting circuit, and the storage circuit is connected with the startup circuit, wherein, the driving circuit for the display unit further comprises:

a pre-charging circuit connected with the storage circuit and configured to pre-charge the storage circuit when receiving a first pre-charging signal which is a pre-charging signal output by a target signal output circuit; and a signal output circuit connected with the control circuit and configured to output a second pre-charging signal for turning on at least one target pre-charging circuit to perform pre-charging when the control circuit turns on the startup circuit.

17. The display device according to claim 16, wherein the display unit comprises a red light display unit, a green light display unit and a blue light display unit; or the display unit comprises a red light display unit, a green light display unit, a blue light display unit and a yellow light display unit; or the display unit comprises a red light display unit, a green light display unit, a blue light display unit and a white light display unit.

* * * * *